(12) United States Patent
Wrobel-Daveau et al.

(10) Patent No.: US 11,428,846 B2
(45) Date of Patent: Aug. 30, 2022

(54) USER INTERFACE FOR GENERATING A PSEUDO-WELL TO AID IN PLANNING OR PERFORMING WELLBORE OPERATIONS

(71) Applicant: Landmark Graphics Corporation, Houston, TX (US)

(72) Inventors: Jean-Christophe Wrobel-Daveau, Abingdon (GB); Michael Grant Tetley, Abingdon (GB); Graeme Richard Nicoll, Abingdon (GB)

(73) Assignee: Landmark Graphics Corporation, Houston, TX (US)

( * ) Notice: Subject to any disclaimer, the term of this patent is extended or adjusted under 35 U.S.C. 154(b) by 38 days.

(21) Appl. No.: 17/128,961

(22) Filed: Dec. 21, 2020

(65) Prior Publication Data

US 2022/0196876 A1    Jun. 23, 2022

(51) Int. Cl.
*G01V 99/00* (2009.01)
*E21B 49/00* (2006.01)
*G01V 1/30* (2006.01)

(52) U.S. Cl.
CPC ............ *G01V 99/005* (2013.01); *E21B 49/00* (2013.01); *G01V 1/301* (2013.01); *E21B 2200/20* (2020.05)

(58) Field of Classification Search
CPC ...... G01V 99/005; G01V 1/301; E21B 49/00; E21B 2200/20
See application file for complete search history.

(56) References Cited

U.S. PATENT DOCUMENTS

| 8,229,950 | B2 | 7/2012 | Savary-Sismondini et al. |
| 2010/0257004 | A1 | 10/2010 | Perlmutter et al. |
| 2016/0139298 | A1 | 5/2016 | Singh et al. |
| 2018/0052253 | A1 | 2/2018 | Kuhn et al. |
| 2020/0158898 | A1* | 5/2020 | Le Guern ............ G01V 1/345 |

FOREIGN PATENT DOCUMENTS

| EP | 2718742 | 1/2019 |
| WO | 2010076638 | 7/2010 |
| WO | 2016144763 | 9/2016 |
| WO | 2020032917 | 2/2020 |

OTHER PUBLICATIONS

PCT Application No. PCT/US2020/066616, International Search Report and Written Opinion, dated Sep. 1, 2021, 8 pages.

* cited by examiner

*Primary Examiner* — Manuel A Rivera Vargas
(74) *Attorney, Agent, or Firm* — Kilpatrick Townsend & Stockton LLP (57) ABSTRACT

A system can output a graphical user interface for use in planning or performing a wellbore operation. The system can receive a location of a geological point location of interest for subterranean exploration and a geological timeframe for the geological point location of interest. The system can determine present-day data about the geological point location of interest from the received location. The system can generate a pseudo-well and reconstruct geological-historical parameters in separate time-intervals based on the received location, plate-tectonic models, and paleo-geographic datasets. The system can generate a graphical user interface including present-day data, paleo-geographic data, plate-tectonic data, and plate-interaction data. The system can output the graphical user interface for use in planning or performing a wellbore operation to extract hydrocarbon fluid.

20 Claims, 6 Drawing Sheets

USER INTERFACE FOR GENERATING A PSEUDO-WELL TO AID IN PLANNING OR PERFORMING WELLBORE OPERATIONS

TECHNICAL FIELD

The present disclosure relates generally to wellbore operations and, more particularly (although not necessarily exclusively), to generating and outputting a user interface for use in planning or performing wellbore operations.

BACKGROUND

Various wellbore operations can be performed with respect to a subterranean formation. The wellbore operations may include hydrocarbon exploration, wellbore drilling, hydrocarbon production, and the like. The wellbore operations may access data about the subterranean formation, but the data may lack historical or existing information, such as data derived from regional synthesis, multi-disciplinary integration, and geological modeling, about the subterranean formation or may be otherwise incomplete. Additionally, the data may be scattered or otherwise may not be easily viewable or usable by an operator or supervisor of the wellbore operations.

DETAILED DESCRIPTION

Certain aspects and examples of the present disclosure relate to generating and outputting a graphical user interface, using present-day data and reconstructed data about a geological point location of interest or well trajectory of interest, for generating a pseudo-well for use in planning or performing wellbore operations. The point location of interest or the well trajectory of interest may include a subterranean reservoir, a rock basin, or other suitable geological features for use in wellbore operations. The present-day data may include a geographic location that includes a latitude and longitude, an elevation, an age of the point location of interest or the well trajectory of interest, and the like. The reconstructed data may include a set of geological-historical parameters that include paleo-geographic data, plate-tectonic data, plate-interaction data, and the like. The graphical user interface may include the present-day data longitudinally arranged with respect to the reconstructed data, and along a vertical axis that represents a time scale or a thickness scale for the present-day data and the reconstructed data. The graphical user interface may be used for planning wellbore operations such as for subterranean or hydrocarbon exploration operations. Additionally or alternatively, the graphical user interface may be used for performing wellbore operations. For example, the graphical user interface may be used to optimize a wellbore drilling operation or to advise an operator or supervisor of a hydrocarbon production operation. The pseudo-well may include data similar or identical to a hydrocarbon well if the hydrocarbon well was formed at the point location of interest or at the well trajectory of interest.

Time-dependent properties or attributes of various points on Earth can be represented through geological time and can include different paleogeography configurations. Tools to extract, calculate, visualize, and export a range of parameters useable in other geological modeling applications, such as basin modeling, can be used and may offer readily-consumable, multi-variable insights for understanding geological context through time at given locations. For example, for combinations of latitude and longitude for a planned hydrocarbon well, available geological information can be extracted. Additionally, the information can be digested to help inform of subsurface risks and lithologies that may be present at the specified location and connected to wider, regional, geological contextual elements.

Insights on physical parameters can be provided at given geographical locations throughout geological history. The physical parameters can be extracted based on present-day data and on calculations made using a plate-tectonic model input. Additional paleo-geographic data may be extracted from other data products generated in paleo-geographic view. Results can be displayed and visualized in the form of correlative charts available in a time-scaled display and thickness-scaled display and can be exported in various industry-standard file formats. Paleo-geographic parameters, variables, and properties from paleo-geographic-based data content, such as paleo-facies, paleo-bathymetry, paleo-topography and the like, can be extracted automatically. Plate-tectonic model-based properties or attributes can be calculated and may include point velocity in mm/yr, point velocity azimuth in degrees, point acceleration, point proximity to plate boundaries in km, paleo-heat flow, paleo-crustal thickness and the like. Plate-interaction parameters including the direction and intensity of a resultant plate motion vector between the plate and its closest neighbor, an amount of relative movement in km, and estimated geodynamic setting qualifiers can be calculated. The previously described information can be displayed together in an easily-digestible graphical user interface.

A micro-service can be generated that connects to a computing device, and the micro-service may allow a user to input a geographical location on Earth. In some examples, the input can be a single numerical point value from a map interface or from a table of geographical locations. The user can specify a geological time range as additional input. The micro-service can output results of relevant geological data for the location and the time of interest including lithology, thickness, and relevant data from existing petroleum systems. Data query may include a spatial query to surrounding areas, data synthesis, and calculation of uncertainty.

For the present-day geography, information from surrounding drilled wells that are within a user-defined distance from starting latitude and longitude combinations can be used. The information can be added to a final graphical output. The information can be extracted from an existing public or private geological database. Additional information and projections such as observed lithology, thickness of lithology, and formation names can be augmented to the information from surrounding well data. From the present-day geographical locations, the micro-service can calculate paleo-geographic coordinates at time increments, as far back in time as is geologically relevant, or can calculate a list of specific time intervals based on the input geological time range. The reconstruction calculation may use Euler transformation algorithms to achieve the geometrical transformation on a sphere together with a plate tectonic model including reconstruction parameters that define the motion. The Euler transformation algorithms may include rotational analyses.

In some examples, in order to perform the reconstruction, a depth to geological age grid relationship can be defined using regional and global geological datasets including but not limited to 3D subsurface structural framework surfaces (x, y, z surface grids) at defined geological ages. Alternatively, a synthetic integration of offset wells relevant to define the age/depth grid relationship for this point location or well trajectory of interest can be used. The intersection between the selected geological point location or well trajectory and the 3D subsurface structural framework surfaces (x, y, z surface grids) at defined geological ages can be performed in order to assign geological ages at intersecting depths. Between the intersecting depths, a linear age interpolation can be performed in the absence of additional age data. Other suitable operations can be performed to create an age-depth relationship or grid along a point location, a vertical sampling, or a well trajectory.

The point location or well trajectory can be reconstructed to paleo-space at intervals of geological time. An area of influence can be defined around the point location or the well trajectory at each reconstructed interval. Reconstructed offset wells and historical or existing data intersecting the area of influence can be selected for each interval of time. For each of the reconstructed intervals, the spatial distance can be calculated in paleo-geographic space between the point location of interest or the well trajectory of interest and each of the offset wells located within the area of influence. Geological features such as faults and geological boundaries within the area of influence can be selected based on spatial intersection with the area of interest in present-day or at each interval of geological time in paleo-geographic space. The faults and geological boundaries within the area of influence can be used to assign a risk and uncertainty of using the data located within the area of influence. Based on the risk and uncertainty, offset and historical wells can be validated, selected, or rejected for calculation of a depth to geological age grid relationship for the point location of interest or the well trajectory of interest. The data selected or validated within the offset wells and historical or existing data for each interval of geological time can be integrated and can have a weighted influence or contribution to the generation of at least one pseudo-well or other more advanced calculation based on spatial distance to the point location of interest or well trajectory of interest. The pseudo-well age-depth grid can be created by synthesis of thickness-age paired values from the offset wells using a method such as a weighted mean and the like.

A synthetic lithology for the point location of interest or the well trajectory of interest can be created from the present day geography using a method that may incorporate global databases of depositional facies maps created at intervals of time. The method may include synthesizing existing lithology data from offset wells using an approach similar to the above-described in which the offset wells and the point location of interest or the well trajectory of interest are reconstructed at intervals of geological time. Spatial selection or validation can be performed, and pseudo-well time lithology can be synthetized to create lithology-age paired values from the offset wells using a method such as a weighted mean and the like.

Once reconstructed, the micro-service can extract and plot parameters including paleo-geographical coordinates through the selected time period or geologically-relevant time period for the particular user-defined point locations of interest or well trajectories of interest. The micro-service can extract and synthesize relevant paleogeographic-based data content including paleo-bathymetry, paleo-topography, rock lithological facies, Earth-system science models such as sea level changes, sea water temperature, climatic belt, sediment flux, sediment quality predictions, and the like, rock properties. The micro-service can calculate plate-tectonic model-based properties including point velocity in mm/yr, point velocity azimuth in degrees, point acceleration as a gradient, point proximity to plate boundaries, active tectonic features such as distance in km, and the like. The micro-service can calculate plate interaction parameters including the resultant plate motion vector between the plate and its closest neighbor, the amount of relative movement in km, and the estimated geodynamic setting qualifier. The results can be presented in a graphical user interface including vertical, multivariate, chronological charts. The vertical axis can be geological time, thickness, or other suitable vertical scales for displaying the output of the micro-service.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
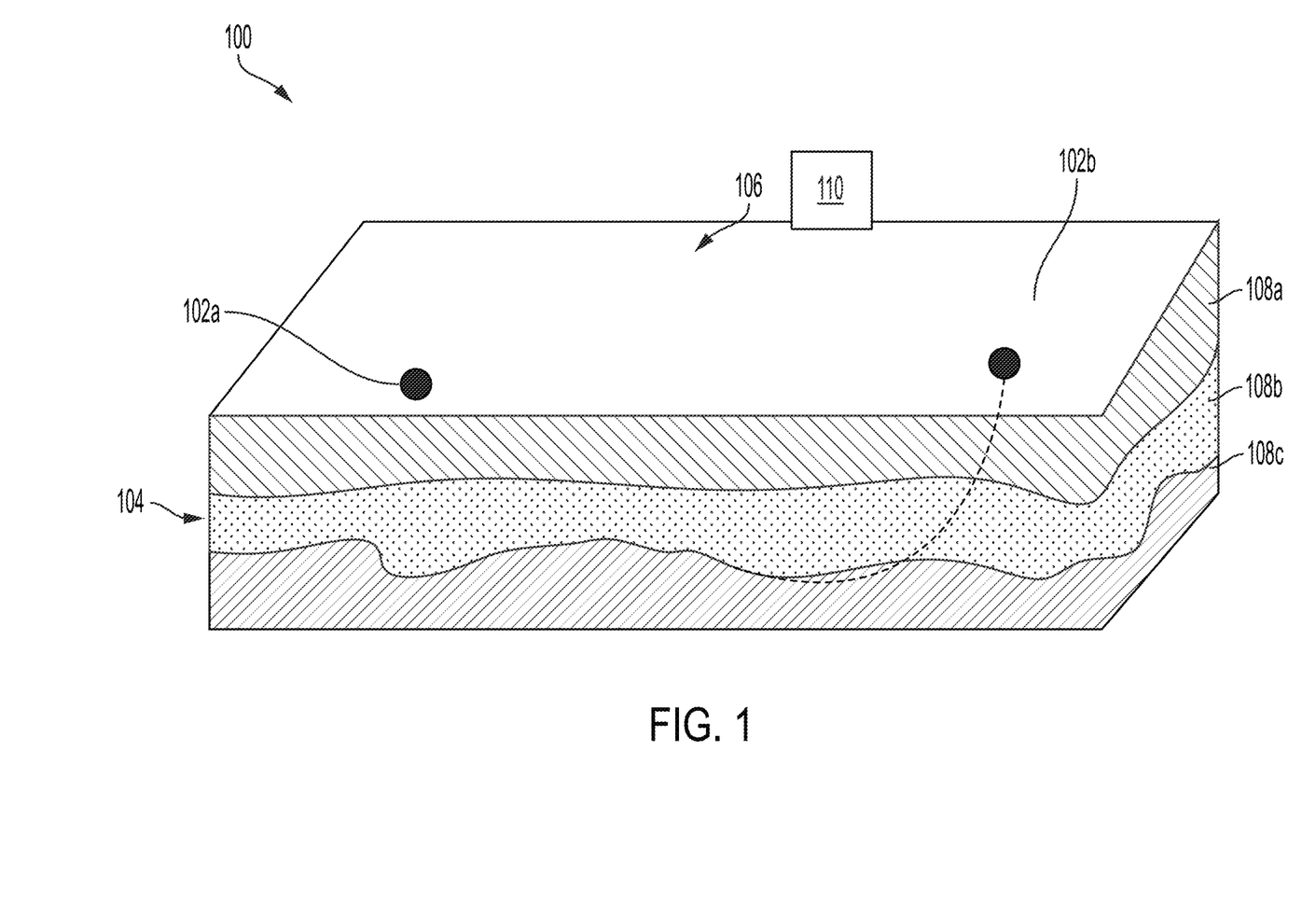
FIG. 1 is a cross-sectional side view of a subterranean formation that includes at least one geological point location of interest or well trajectory of interest according to one example of the present disclosure.

FIG. 1 is a cross-sectional side view of a subterranean formation 100 that includes at least one geological point location of interest 102a or well trajectory of interest 102b according to one example of the present disclosure. The geological point location of interest 102a may include an intersection of an x,y coordinate, defined by a user, and the surface of the Earth. The subterranean formation 100 may include an underground region 104 and a surface region 106. The underground region 104 may be formed of various strata 108a-c that include different materials (e.g., rock, soil, oil, water, or gas) and that may vary in thickness and shape. The geological point location of interest 102a or the well trajectory of interest 102b may be included in the strata 108 and may include hydrocarbon material.

A computing device 110 may be positioned at the surface 106 of the subterranean formation 100 or elsewhere (e.g., offsite). The computing device 110 may be in communication with sensors or other electronic devices used for wellbore operations. For example, the computing device 110 can include a communication interface, or be communicatively coupled to a communications device, for transmitting information to and receiving information from another communication interface of an exploration subsystem. The computing device 110 can receive present-day data about the geological point location of interest 102a or the well trajectory of interest 102b including an elevation, a location, and other relevant present-day data. In some examples, a user may input the present-day data into the computing device 110. Although one computing device 110 is depicted in FIG. 1, in other examples, more than one computing device can be used, and, together, the multiple computing devices can perform operations such as those described in the present disclosure. The computing device 110 is depicted as being positioned at the surface 106, but, in other examples, the computing device 110 can be positioned belowground, aboveground, onsite, in a vehicle, offsite, etc.

In some examples, the computing device 110 can include a communication device. The communication device can represent one or more of any components that facilitate a network connection. For example, the communications device can allow the computing device 110 to interface with other devices via a wired connection. But, in other examples, the communication device can allow the computing device 110 to interface with other devices wirelessly and can include wireless interfaces such as IEEE 802.11, Bluetooth™, or radio interfaces for accessing cellular telephone networks (e.g., transceiver/antenna for accessing a CDMA, GSM, UMTS, or other mobile communications network). In some examples, the communication device can use acoustic waves, surface waves, vibrations, optical waves, or induction (e.g., magnetic induction) for engaging in wireless communications. In an example in which the communication device is wired, the communications device can include interfaces such as Ethernet, USB, IEEE 1394, or a fiber optic interface. In an example with at least one other computing device, the computing device 110 can receive wired or wireless communications from the other computing device and perform one or more tasks based on the communications.

The computing device 110 may use the present-day data about the geological point location of interest 102a or the well trajectory of interest to reconstruct data about the geological point location of interest 102a or the well trajectory of interest 102b and to generate a graphical user interface that includes the present-day data and the reconstructed data. The reconstructed data may include geological-historical parameters such as paleo-geographic data, plate-tectonic data, plate-interaction data, and the like. Additionally, the computing device 110 may output the present-day data and the reconstructed data for use in a geological modeling application. In some examples, alternative to the computing device 110 reconstructing the data and generating the graphical user interface, the computing device 110 may transmit the present-day data about the geological point location of interest 102a or the well trajectory of interest 102b to an offsite facility (not shown) for reconstructing the data and generating the graphical user interface. In this example, the offsite facility may transmit the reconstructed data and generated graphical user interface to the computing device 110. In response to generating or receiving the graphical user interface, the computing device 110 may output the graphical user interface for viewing by the user. The output graphical user interface may be used by an operator or supervisor of a wellbore operation to model the geological point location of interest 102a or the well trajectory of interest 102b or for performing other tasks related to planning or performing wellbore operations at the geological point location of interest 102a or the well trajectory of interest 102b.

Figure 2:
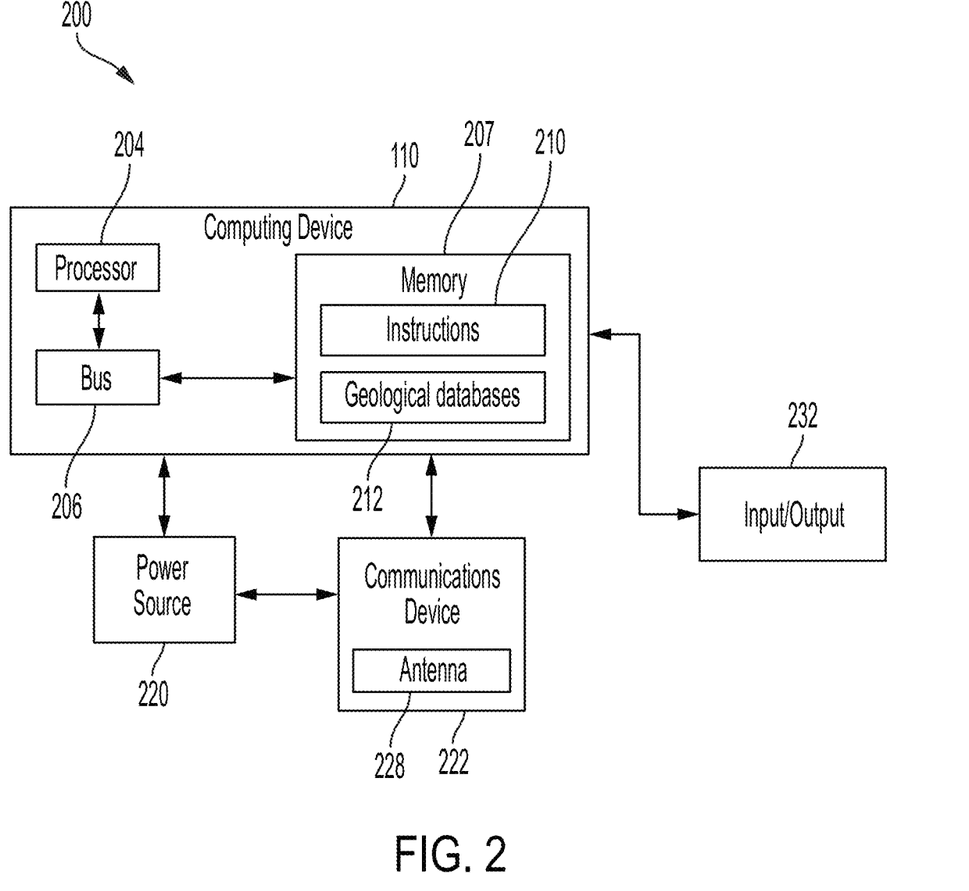
FIG. 2 is a block diagram of a computing system for generating and outputting a graphical user interface for use in planning or performing wellbore operations according to one example of the present disclosure.

FIG. 2 is a block diagram of a computing system 200 for generating and outputting a graphical user interface for use in planning or performing wellbore operations according to one example of the present disclosure. The components shown in FIG. 2 (e.g. the computing device 110, power source 220, etc.) can be integrated into a single structure. For example, the components can be within a single housing. In other examples, the components shown in FIG. 2 can be distributed via separate housings or otherwise, and in electrical communication with each other.

The system 200 may include the computing device 110. The computing device 110 can include a processor 204 interfaced with other hardware via a bus 206. A memory 207, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 110. In some aspects, the computing device 110 can include input/output interface components (e.g., a display, printer, keyboard, touch-sensitive surface, and mouse) and additional storage.

The processor 204 can execute one or more instructions 210, or operations, stored in the memory 207 for generating and outputting the graphical user interface for use in planning or performing wellbore operations. For example, the processor 204 can receive a location of the geological point location of interest 102a or the well trajectory of interest 102b from user input, by accessing a geological database, or a combination thereof, and the processor 204 can use the input to generate a pseudo-well, to reconstruct data, and to generate the graphical user interface. The processor 204 may reconstruct the data by accessing at least one geological database 212. The geological database 212 may include a present-day geological database, a paleo-geological database, a plate-tectonic database, and the like. The memory 207 may include the geological databases 212. Additionally or alternatively, an offsite computing device may include the geological databases 212, and the instructions 210 may be executable by the processor 204 to cause the processor 204 to access the offsite computing device. The instructions 210 may include other suitable instructions for generating and outputting the graphical user interface for use in planning or performing wellbore operations. The processor 204 can execute the instructions 210 stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The memory 207 may be non-volatile and may include any type of memory device that retains stored information when powered off. Non-limiting examples of the memory 207 include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The computing system 200 can include a power source 220. The power source 220 can be in electrical communication with the computing device 110 that may include a communications device 222. In some examples, the power source 220 can include a battery or an electrical cable (e.g., a wireline). The power source 220 can include an AC signal generator. The computing device 110 can operate the power source 220 to apply a transmission signal to an antenna 228, in an example in which the communications device 222 is operating in a wireless mode, to forward data relating to the geological point location of interest 102a or the well trajectory of interest 102b, etc. to other systems. For example, the computing device 110 can cause the power source 220 to apply a voltage with a frequency within a specific frequency range to the antenna 228. This can cause the antenna 228 to generate a wireless transmission. In other examples, the computing device 110, rather than the power source 220, can apply the transmission signal to the antenna 228 for generating the wireless transmission.

In some examples, part of the communications device 222 can be implemented in software. For example, the communications device 222 can include additional instructions stored in memory 207 for controlling functions of the communications device 222. The communications device 222 can receive signals from remote devices and transmit data to remote devices. For example, the communications device 222 can transmit wireless communications that are modulated by data via the antenna 228. In some examples, the communications device 222 can receive signals (e.g. associated with data to be transmitted) from the processor 204 and amplify, filter, modulate, frequency shift, or otherwise manipulate the signals. In some examples, the communications device 222 can transmit the manipulated signals to the antenna 228. The antenna 228 can receive the manipulated signals and responsively generate wireless communications that carry the data.

The computing system 200 can additionally include an input/output interface 232. The input/output interface 232 can connect to a keyboard, pointing device, display, and other computer input/output devices. An operator may provide input using the input/output interface 232. Additionally or alternatively, the operator may view outputs from the computing device 110 on the input/output interface 232. The graphical user interface may be displayed to the operator on the input/output interface 232. The displayed graphical user interface may provide an advisory function to the operator, or to the supervisor, of an operation using the computing system 200, either of whom can make adjustments to the operation based on the displayed graphical user interface. In some examples, in response to viewing the reconstructed historical data and the present-day data about the geological point location of interest 102a or the well trajectory of interest 102b on the displayed graphical user interface, the operator may recommend or not recommend drilling a hydrocarbon well at the geological point location of interest 102a or the well trajectory of interest 102b. Additionally or alternatively, the computing device 110 may output data from the graphical user interface for use in geological modeling applications. In an example, the operator can use the output data from the graphical user interface and model a subset of the geological point location of interest 102a or the well trajectory of interest 102b for controlling a wellbore operation.

Figure 3:
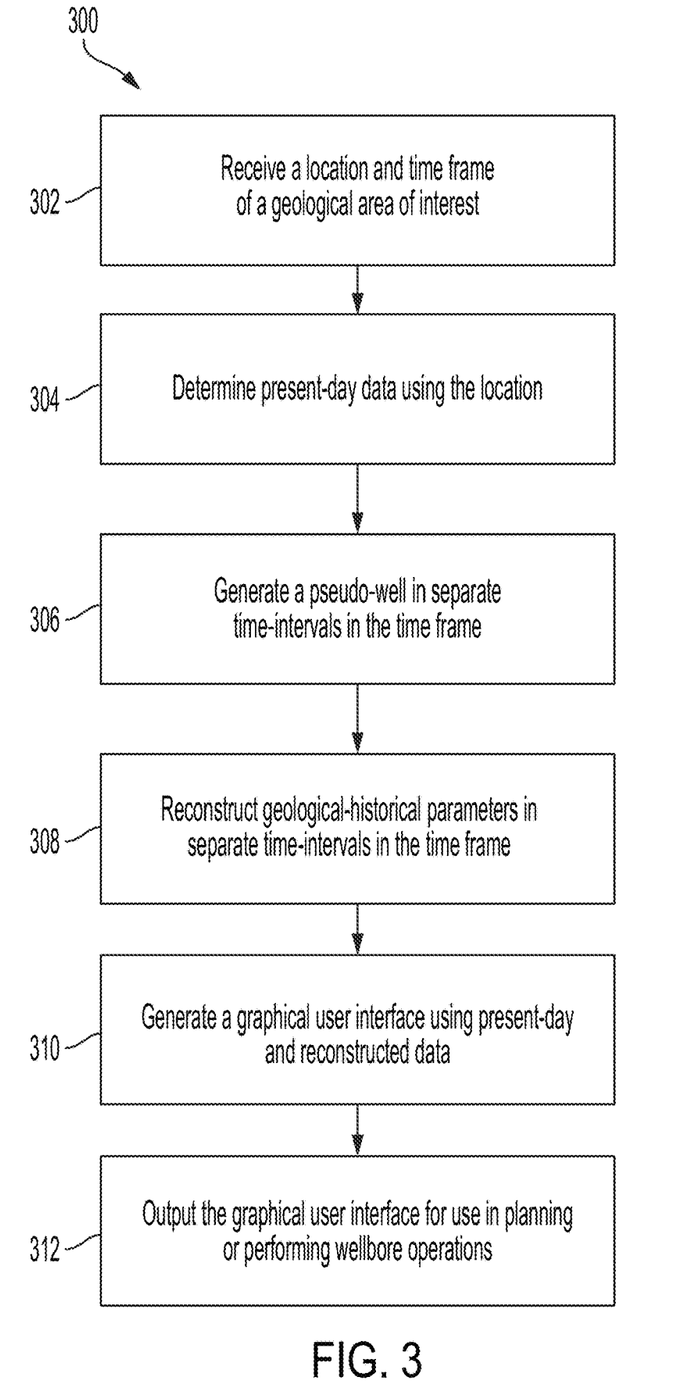
FIG. 3 is a flow chart of a process for generating and outputting a graphical user interface for use in planning or performing wellbore operations according to one example of the present disclosure.

FIG. 3 is a flow chart of a process 300 for generating and outputting a graphical user interface for use in planning or performing wellbore operations according to one example of the present disclosure. At block 302, the computing device 110 receives a location and a time-frame of a geological point location of interest 102a or the well trajectory of interest 102b. The location and the time-frame may be received by user input, by accessing one or more of the geological databases 212, or in other suitable manners for receiving information about the geological point location of interest 102a or the well trajectory of interest 102b. More than one location or time-frame may be received by the computing device 110 for the geological point location of interest 102a or the well trajectory of interest 102b. And, more than one geological point location of interest 102a or more than one well trajectory of interest 102b may be received by the computing device 110. The location and the time-frame may respectively be a suitable size for generating and outputting the graphical user interface for planning or performing wellbore operations.

At block 304, the computing device 110 determines present-day data about the geological point location of interest 102a or the well trajectory of interest 102b using the received location. The present-day data about the geological point location of interest 102a or the well trajectory of interest 102b may include an age, a latitude, a longitude, an elevation, and other suitable information relating to the present-day data. The present-day data may be determined by the computing device 110 by accessing one or more geological databases 212 such as the present-day geological database. In some examples, the present-day data can be received by the computing device 110 via user input.

At block 306, the computing device 110 generates a pseudo-well at the point location of interest 102a or at the well trajectory of interest 102b. The computing device 110 may use the location, received at the block 302, and plate-tectonic models to generate the pseudo-well. The pseudo-well may be generated by the computing device 110 in separate time-intervals within the time-frame received at the block 302. In some examples, the separate time-intervals may be selected by the user, or, in other examples, the separate time-intervals may be automatically determined by the computing device 110 based on the received time-frame for the geological point location of interest 102a or the well trajectory of interest 102b.

At block 308, the computing device 110 reconstructs geological-historical parameters in separate time-intervals in the time-frame. The computing device 110 may perform the reconstruction using the geological databases 212, the generated pseudo-well, and the like. The geological-historical parameters may include paleo-geographic data, plate-tectonic data, and plate-interaction data for a geological history about the geological point location of interest 102a or the well trajectory of interest 102b. The paleo-geographic data may include a paleo-temperature, a paleo-elevation, and a paleo-facies that includes rock-type of the geological point location of interest 102a or the well trajectory of interest 102b. The plate-tectonic data may include point velocity and a distance to plate boundaries. The plate-interaction data may include an amount of relative movement and a geodynamic setting qualifier that may represent a type of interaction between two or more tectonic plates that may include a tectonic plate carrying the received location and one or more tectonic plates adjacent to the tectonic plate. Other suitable geological-historical parameters may be reconstructed for generating and outputting the graphical user interface. In some examples, the geological-historical parameters may be output on a graphical user interface and in a useable tabular format such as a comma separated values file format.

In some examples, the present-day data and the geological-historical parameters may be correlated by age attributes. As such, the computing device 110 may reconstruct the geological-historical parameters by using stratigraphic time-attributes. The stratigraphic time-attributes may be determined from the strata 108 and may provide insight on information or other data relating to the geological point location of interest 102a or the well trajectory of interest 102b within the separate time-intervals. In some examples, the generated pseudo-well may represent a hydrocarbon well at the geological point location of interest 102a or the well trajectory of interest 102b if the hydrocarbon well was formed at the geological point location of interest 102a or the well trajectory of interest 102b. And, in these examples, the geological-historical parameters may represent geological data about the pseudo-well such that the time-scaled data and the thickness-scaled data included in the user interface can be generated for the pseudo-well.

At block 310, the computing device 110 generates the graphical user interface using the determined present-day data and the reconstructed parameters. The graphical user interface may include a subset of the present-day data and a subset of the reconstructed parameters. In some examples, additional or alternative data may be included on the graphical user interface for planning, performing, or otherwise controlling a wellbore operation. The graphical user interface may include the present-day data longitudinally arranged with respect to the reconstructed parameters. The present-day data and the reconstructed parameters may be displayed on the graphical user interface along a vertical axis that represents a time scale or a thickness scale. The graphical user interface is described in detail with respect to FIGS. 4 and 5.

At block 312, the computing device 110 outputs the graphical user interface for use in planning or performing a wellbore operation. In some examples, planning a wellbore operation may include a subterranean or hydrocarbon exploration operation and performing a wellbore operation may include drilling a hydrocarbon well or producing hydrocarbon from an existing well. The output graphical user interface may be used to optimize or otherwise improve the wellbore operation. The computing device 110 may additionally or alternatively output the graphical user interface for other suitable operations relating to potential, planned, or existing wellbores. In some examples, the computing device 110 may additionally output the present-day data, the reconstructed parameters, or a combination thereof for use in a geological modeling application.

Figure 4:
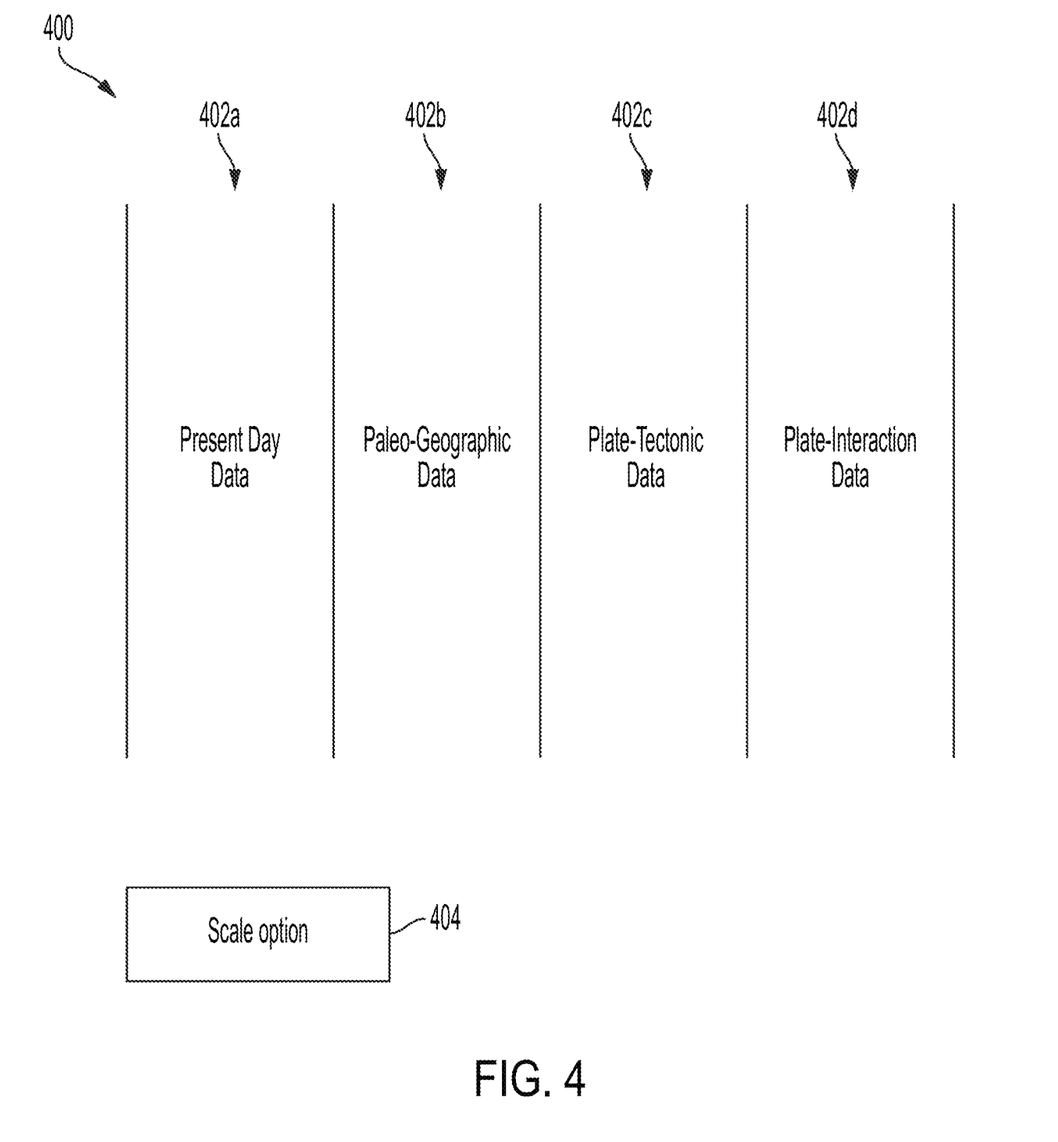
FIG. 4 is an example of a graphical user interface generated for use in planning or performing wellbore operations according to one example of the present disclosure.

FIG. 4 is an example of a graphical user interface 400 generated for use in planning or performing wellbore operations according to one example of the present disclosure. As illustrated, the graphical user interface 400 includes four vertical sections 402a-d, but the graphical user interface may include other suitable sections for planning or performing wellbore operations. The vertical section 402a may include the present-day data, and the vertical sections 402b-d may include the reconstructed geological-historical parameters. The present-day data about the geological point location of interest 102a or the well trajectory of interest 102b may include the age, the latitude and the longitude as a function of depth, and other suitable present-day data. The reconstructed parameters about the geological point location of interest 102a or the well trajectory of interest 102b may include paleo-geographic data, plate-tectonic data, and plate-interaction data for a geological history about the geological point location of interest 102a or the well trajectory of interest 102b. The section 402b may include the paleo-geographic data, the section 402c may include the plate-tectonic data, and the vertical section 402d may include the plate-interaction data. Other suitable reconstructed geological-historical parameters may be displayed on the graphical user interface 400 for planning or performing wellbore operations.

The computing device 110 may generate and output the graphical user interface 400 using a time scale in which the vertical sections 402a-d are displayed on the graphical user interface 400 on a vertical axis that represents time as an independent variable. As an example of the time scale, the vertical section 402b may include paleo-elevation displayed on the time scale, and in this example, the most-recent paleo-elevation may be displayed at the top portion of the vertical section 402b. The oldest paleo-elevation may be displayed at the bottom portion of the vertical section 402b, and the paleo-elevation at the different time-intervals may be displayed chronologically between the most-recent paleo-elevation and the oldest paleo-elevation.

Alternative to the computing device 110 generating and displaying the graphical user interface 400 using the time scale, the computing device 110 can generate and display the graphical user interface 400 using a thickness scale. The vertical axis of the graphical user interface 400 using the thickness scale may represent thickness or distance. The information conveyed on the graphical user interface 400 using the thickness scale may be similar or identical to the information conveyed on the graphical user interface 400 using the time scale. The user may select whether to display the graphical user interface 400 using the time scale or using the thickness scale by using a scale option 404 that may be located at the bottom left portion of the graphical user interface 400. The scale option 404 may be located in other suitable places on the graphical user interface 400 for selecting the time scale or the thickness scale.

Figure 5:
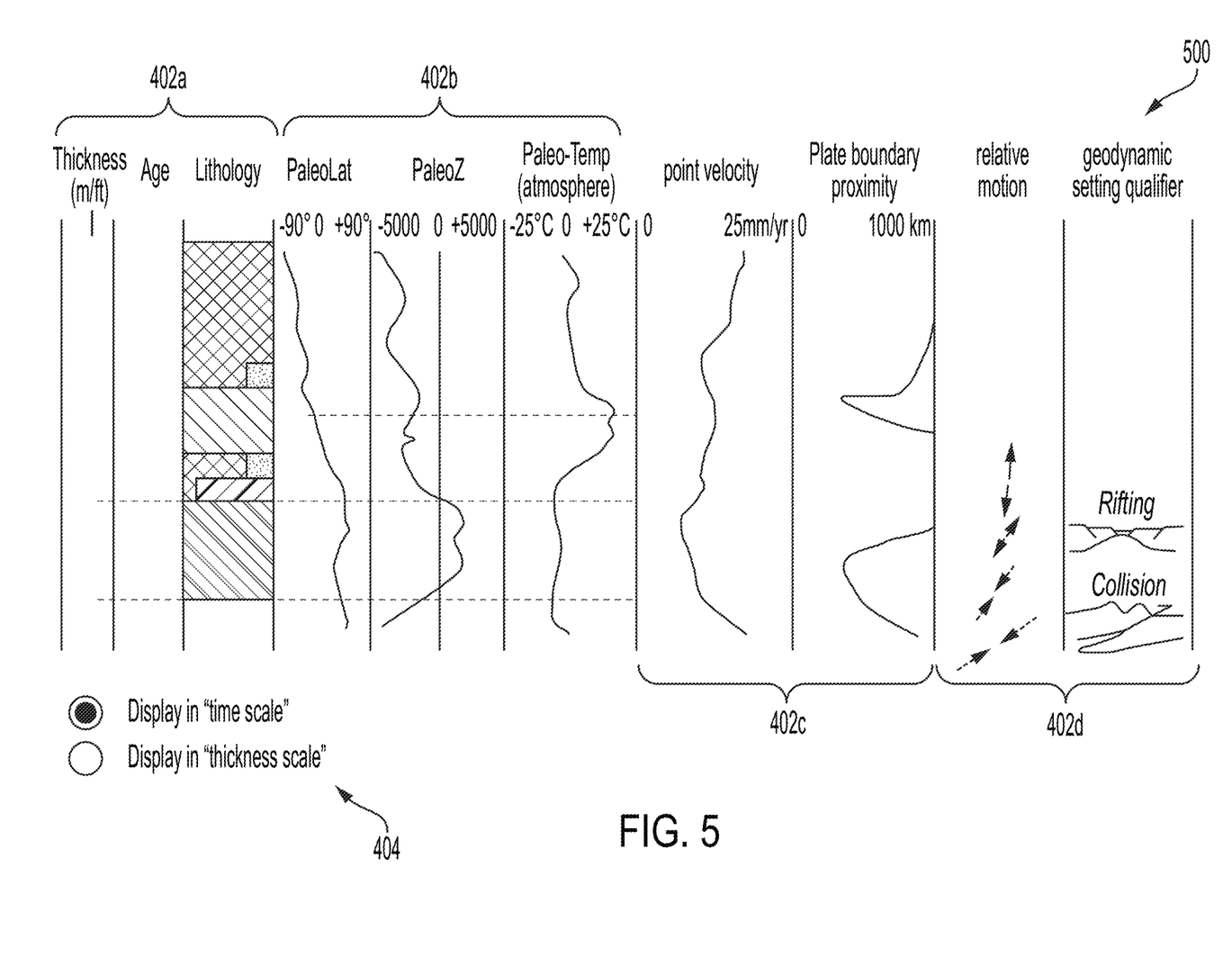
FIG. 5 is an example of a graphical user interface generated for use in planning or performing wellbore operations according to one example of the present disclosure.

FIG. 5 is an example of a graphical user interface 500 generated for use in planning or performing wellbore operations according to one example of the present disclosure. The graphical user interface 500 may include the vertical sections 402a-d and the scale option 404. As illustrated, the graphical user interface 500 displays the time scale, in which the independent variable on the vertical axis is time, for the present-day data, the paleo-geographic data, the plate-tectonic data, and the plate-interaction data. In some examples, a subset of the present-day data, the paleo-geographic data, the plate-tectonic data, and the plate-interaction data may be displayed on the graphical user interface 500. In other examples, other suitable data may be displayed on the graphical user interface 500 for planning or performing wellbore operations. The user may use the scale option 404 to select the scale format in which the graphical user interface 500 may display the vertical axis. The scale format may include a thickness scale, a geological time scale, or other suitable scales for display on the user interface 500.

The computing device 110 may additionally display a horizontal axis on the graphical user interface 500. The horizontal axis may represent a set of dependent variables that may correspond to a type of data on the graphical user interface 500. The dependent variables may include age, degrees of latitude or longitude, elevation or bathymetry, temperature, rock-type, velocity, distance, relative movement, and setting type. The dependent variables may include other suitable dependent variables for displaying on the graphical user interface 500. The elevation, the age, and the lithology/rock facies may correspond to the present-day data for the geological point location of interest 102a or the well trajectory of interest 102b. The degrees of paleo-latitude or paleo-longitude, the elevation, the temperature, and the rock-type may correspond to the paleo-geographic data that may include a paleo-location, a paleo-elevation, a paleo-temperature (e.g. ocean or atmosphere), and paleo-facies. The velocity and the distance may correspond to the plate-tectonic data that includes point velocity and distance to plate boundaries. The relative movement and the setting type may correspond to the plate-interaction data that includes the amount of relative movement and the geodynamic setting qualifier.

Figure 6:
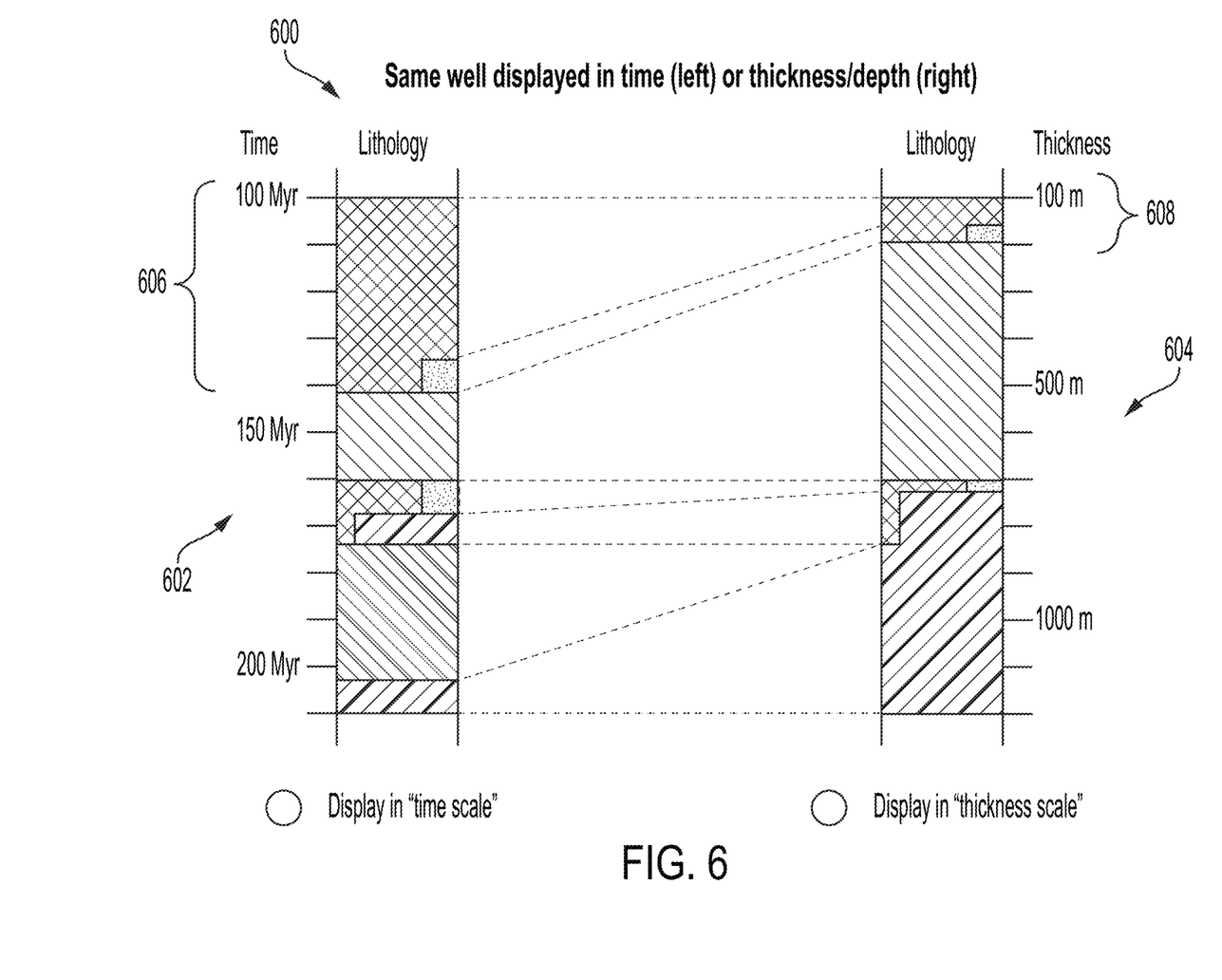
FIG. 6 is an example of a graphical user interface using a thickness scale generated for use in planning or performing wellbore operations according to one example of the present disclosure.

FIG. 6 is an example of a portion 600 of a graphical user interface 500 using a thickness scale generated for use in planning or performing wellbore operations according to one example of the present disclosure. As illustrated, the portion 600 includes measures of paleo-facies of the geological point location of interest 102a or the well trajectory of interest 102b in a time scale 602 and in a thickness scale 604. In an example in which the user uses the scale option 404 to choose the thickness scale, the computing device 110 may transform data from the time scale to the thickness scale. The dependent variable of the paleo-facies using the time scale may be similar or identical to the dependent variable of the paleo-facies using the thickness scale.

The information contained in the time scale 602 may additionally be included in the thickness scale 604. For example, a top portion 606 of the time scale may include similar or identical information as a top portion 608 of the thickness scale 604. The top portion 606 may span approximately 50 million years, while the top portion 608 may span approximately 100 meters. Whether displayed on the graphical user interface 500 using the time scale 602 or using the thickness scale 604, the information from the top portions 606 and 608 may be the same. In some examples, information displayed using the time scale 602 may be easier to understand or more useful than displayed using the thickness scale 604. But, in other examples, information displayed using the thickness scale 604 may be easier to understand or more useful than displayed using the time scale 602. Though FIG. 6 illustrates a transformation from the time scale 602 to the thickness scale 604 for a single type of data, the transformation from the time scale 602 to the thickness scale 604 may be applied by the computing device 110 to the present-day data, to the reconstructed data, and to other suitable data displayed on the graphical user interface 500.

In some aspects, systems, methods, and non-transitory computer-readable mediums for generating and outputting a user interface for use in planning or performing wellbore operations are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: receiving a location of a geological point location of interest or of a well trajectory of interest for subterranean exploration and a geological time frame for the geological point location of interest or for the well trajectory of interest; determining present-day geological data about the geological point location of interest based on the location of the geological point location of interest or about the well trajectory of interest based on the location of the well trajectory of interest; generating a pseudo-well in separate time intervals in the geological time frame using the received location of the geological point location of interest or of the well trajectory of interest and plate-tectonic models; reconstructing, using the generated pseudo-well and paleo-geographic datasets, geological-historical parameters in the separate time intervals in the geological time frame, the geological-historical parameters including paleo-geographic data, plate-tectonic data, and plate-interaction data for a geological history about the geological point location of interest or about the well trajectory of interest; generating a graphical user interface that includes the present-day geological data longitudinally arranged with respect to the paleo-geographic data, the plate-tectonic data, and the plate-interaction data, and along a vertical axis that represents a time scale or a thickness scale for the present-day geological data, the paleo-geographic data, the plate-tectonic data, and the plate-interaction data; and outputting the graphical user interface for use in planning or performing a wellbore operation to extract hydrocarbon fluid.

Example 2 is the system of example 1, wherein the operation of reconstructing the geological-historical parameters in the separate time intervals in the geological time frame includes: generating a temporal geological model for the location of the geological point location of interest or of the well trajectory of interest by accessing a plate tectonic geo-database and a paleo-geographic geo-database, wherein the plate tectonic geo-database includes rotation pole information, polygon identifications and plate boundary lines; executing rotational analysis on the temporal geological model for reconstructing the geological-historical parameters in the separate time intervals in the geological time frame; and outputting the reconstructed geological-historical parameters on the graphical user interface and in a useable tabular format.

Example 3 is the system of any of examples 1 and 2, wherein the operation of outputting the graphical user interface includes generating the graphical user interface comprising: a vertical axis that includes a plurality of vertical sections; a horizontal axis; an option for selecting the time scale or the thickness scale; and wherein: the plurality of vertical sections includes the present-day geological data, the paleo-geographic data, the plate-tectonic data, and the plate-interaction data; the vertical axis represents an independent variable that includes time values for the time scale, or thickness values for the thickness scale, for the present-day geological data, the paleo-geographic data, the plate-tectonic data, and the plate-interaction data; the independent variable is on the vertical axis for each of the present-day geological data, the paleo-geographic data, the plate-tectonic data, and the plate-interaction data; the horizontal axis represents a plurality of dependent variables, the plurality of dependent variables including: thickness, age, and lithology which is a rock type for the present-day geological data; degrees of paleo-latitude or paleo-longitude, paleo-elevation or paleo-bathymetry, and paleo-temperature for the paleo-geographic data; velocity and distance for the plate-tectonic data; and relative movement and setting type for the plate-interaction data; and each dependent variable of the plurality of dependent variables is respectively on one vertical section of the plurality of vertical sections for the present-day geological data, the paleo-geographic data, the plate-tectonic data, or the plate-interaction data.

Example 4 is the system of example 1, wherein the paleo-geographic data includes temperature, the plate-tectonic data includes point velocity, and the plate-interaction data includes an amount of relative movement.

Example 5 is the system of any of examples 1 and 4, wherein the temperature is atmospheric paleo-temperature, the paleo-geographic data further including paleo-elevation, wherein the plate-tectonic data further includes a distance to plate boundaries, and wherein the plate-interaction data further includes a geodynamic setting qualifier.

Example 6 is the system of example 1, wherein the operation of outputting the graphical user interface for use in planning or performing a wellbore operation to extract hydrocarbon fluid includes outputting the present-day geological data, the paleo-geographic data, the plate-tectonic data, and the plate-interaction data for use in a geological modeling application.

Example 7 is the system of example 1, wherein the operation of reconstructing the geological-historical parameters in the separate time intervals in the geological time frame includes correlating with the geological-historical parameters in the separate time intervals based on stratigraphic time-attributes.

Example 8 is a method comprising: receiving a location of a geological point location of interest or of a well trajectory of interest for subterranean exploration and a geological time frame for the geological point location of interest or for the well trajectory of interest; determining present-day data about the geological point location of interest based on the location of the geological point location of interest or about the well trajectory of interest based on the location of the well trajectory of interest; generating a pseudo-well in separate time intervals in the geological time frame using the received location of the geological point location of interest or of the well trajectory of interest and plate-tectonic models; reconstructing, using the generated pseudo-well and paleo-geographic datasets, geological-historical parameters in the separate time intervals in the geological time frame, the geological-historical parameters including paleo-geographic data, plate-tectonic data, and plate-interaction data for a geological history about the geological point location of interest or about the well trajectory of interest; generating a graphical user interface that includes the present-day data longitudinally arranged with respect to the paleo-geographic data, the plate-tectonic data, and the plate-interaction data, and along a vertical axis that represents a time scale or a thickness scale for the present-day data, the paleo-geographic data, the plate-tectonic data, and the plate-interaction data; and outputting the graphical user interface for use in planning or performing a wellbore operation to extract hydrocarbon fluid.

Example 9 is the method of example 8, wherein the operation of reconstructing the geological-historical parameters in the separate time intervals in the geological time frame includes: generating a temporal geological model for the location of the geological point location of interest or for the location of the well trajectory of interest by accessing a plate tectonic geo-database, wherein the plate tectonic geo-database includes rotation pole information, polygon identifications; executing rotational analysis on the temporal geological model for reconstructing the geological-historical parameters in the separate time intervals in the geological time frame; and outputting the reconstructed geological-historical parameters on the graphical user interface and in a useable tabular format.

Example 10 is the method of any of examples 8 and 9, wherein the operation of outputting the graphical user interface includes generating the graphical user interface comprising: a vertical axis that includes a plurality of vertical sections; a horizontal axis; an option for selecting the time scale or the thickness scale; and wherein: the plurality of vertical sections includes the present-day data, the paleo-geographic data, the plate-tectonic data, and the plate-interaction data; the vertical axis represents an independent variable that includes time values for the time scale, or thickness values for the thickness scale, for the present-day data, the paleo-geographic data, the plate-tectonic data, and the plate-interaction data; the independent variable is on the vertical axis for each of the present-day data, the paleo-geographic data, the plate-tectonic data, and the plate-interaction data; the horizontal axis represents a plurality of dependent variables, the plurality of dependent variables including: thickness, age and lithology which is a rock type for the present-day data; degrees of paleo-latitude or paleo-longitude, paleo-elevation or paleo-bathymetry, and paleo-temperature for the paleo-geographic data; velocity and distance for the plate-tectonic data; and relative movement and setting type for the plate-interaction data; and each dependent variable of the plurality of dependent variables is respectively on one vertical section of the plurality of vertical sections for the present-day data, the paleo-geographic data, the plate-tectonic data, or the plate-interaction data.

Example 11 is the method of example 8, wherein the paleo-geographic data includes paleo-temperature, the plate-tectonic data includes point velocity or the like, and the plate-interaction data includes an amount of relative movement or the like.

Example 12 is the method of any of examples 8 and 11, wherein the paleo-temperature is atmospheric or oceanic paleo-temperature, the paleo-geographic data further including paleo-elevation, wherein the plate-tectonic data further includes a distance to plate boundaries, and wherein the plate-interaction data further includes a geodynamic setting qualifier.

Example 13 is the method of example 8, wherein the operation of outputting the graphical user interface for use in planning or performing a wellbore operation to extract hydrocarbon fluid includes outputting the present-day data, the paleo-geographic data, the plate-tectonic data, and the plate-interaction data for use in a geological modeling application.

Example 14 is the method of example 8, wherein the operation of reconstructing the geological-historical parameters in the separate time intervals in the geological time frame includes correlating the present-day data and the geological-historical parameters in the separate time intervals based on stratigraphic time-attributes.

Example 15 is a non-transitory computer-readable medium comprising instructions that are executable by a processing device for causing the processing device to perform operations comprising: receiving a location of a geological point location of interest or of a well trajectory of interest for subterranean exploration and a geological time frame for the geological point location of interest or for the well trajectory of interest; determining present-day data about the geological point location of interest based on the location of the geological point location of interest or about the well trajectory of interest based on the location of the well trajectory of interest; generating a pseudo-well in separate time intervals in the geological time frame using the received location of the geological point location of interest or of the well trajectory of interest and plate-tectonic models; reconstructing, using the generated pseudo-well and paleo-geographic datasets, geological-historical parameters in the separate time intervals in the geological time frame, the geological-historical parameters including paleo-geographic data, plate-tectonic data, and plate-interaction data for a geological history about the geological point location of interest or about the well trajectory of interest; generating a graphical user interface that includes the present-day data longitudinally arranged with respect to the paleo-geographic data, the plate-tectonic data, and the plate-interaction data, and along a vertical axis that represents a time scale or a thickness scale for the present-day data, the paleo-geographic data, the plate-tectonic data, and the plate-interaction data; and outputting the graphical user interface for use in planning or performing a wellbore operation to extract hydrocarbon fluid.

Example 16 is the non-transitory computer-readable medium of example 15, wherein the operation of reconstructing the geological-historical parameters in the separate time intervals in the geological time frame includes: generating a temporal geological model for the location of the geological point location of interest or of the well trajectory of interest by accessing a plate tectonic geo-database, wherein the plate tectonic geo-database includes rotation pole information, polygon identifications, and plate boundary lines; executing rotational analysis on the temporal geological model for reconstructing the geological-historical parameters in the separate time intervals in the geological time frame; and outputting the reconstructed geological-historical parameters on the graphical user interface and in a useable tabular format.

Example 17 is the non-transitory computer-readable medium of any of examples 15 and 16, wherein the operation of outputting the graphical user interface includes generating the graphical user interface comprising: a vertical axis that includes a plurality of vertical sections; a horizontal axis; an option for selecting the time scale or the thickness scale; and wherein: the plurality of vertical sections includes the present-day data, the paleo-geographic data, the plate-tectonic data, and the plate-interaction data; the vertical axis represents an independent variable that includes time values for the time scale, or thickness values for the thickness scale, for the present-day data, the paleo-geographic data, the plate-tectonic data, and the plate-interaction data; the independent variable is on the vertical axis for each of the present-day data, the paleo-geographic data, the plate-tectonic data, and the plate-interaction data; the horizontal axis represents a plurality of dependent variables, the plurality of dependent variables including: thickness, age, and lithology which is a rock type for the present-day data; degrees of paleo-latitude or paleo-longitude, paleo-elevation or paleo-bathymetry, and paleo-temperature for the paleo-geographic data; velocity and distance for the plate-tectonic data; and relative movement and setting type for the plate-interaction data; and each dependent variable of the plurality of dependent variables is respectively on one vertical section of the plurality of vertical sections for the present-day data, the paleo-geographic data, the plate-tectonic data, or the plate-interaction data.

Example 18 is the non-transitory computer-readable medium of example 15, wherein the paleo-geographic data includes paleo-temperature, the plate-tectonic data includes point velocity, and the plate-interaction data includes an amount of relative movement.

Example 19 is the non-transitory computer-readable medium of any of examples 15 and 18, wherein the paleo-temperature is atmospheric or oceanic paleo-temperature, the paleo-geographic data further including paleo-elevation, wherein the plate-tectonic data further includes a distance to plate boundaries, and wherein the plate-interaction data further includes a geodynamic setting qualifier.

Example 20 is the non-transitory computer-readable medium of example 15, wherein the operation of outputting the graphical user interface for use in planning or performing a wellbore operation to extract hydrocarbon fluid includes outputting the present-day data, the paleo-geographic data, the plate-tectonic data, and the plate-interaction data for use in a geological modeling application.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
a non-transitory computer-readable medium comprising instructions that are executable by the processor to cause the processor to perform operations comprising:
receiving a location of a geological point location of interest or of a well trajectory of interest for subterranean exploration and a geological time frame for the geological point location of interest or for the well trajectory of interest;
determining present-day geological data about the geological point location of interest based on the location of the geological point location of interest or about the well trajectory of interest based on the location of the well trajectory of interest;
generating a pseudo-well in separate time intervals in the geological time frame using the received location of the geological point location of interest or of the well trajectory of interest and plate-tectonic models;
reconstructing, using paleo-geographic datasets and the generated pseudo-well, geological-historical parameters in the separate time intervals in the geological time frame, the geological-historical parameters including paleo-geographic data, plate-tectonic data, and plate-interaction data for a geological history about the geological point location of interest or about the well trajectory of interest;
generating a graphical user interface that includes the present-day geological data longitudinally arranged with respect to the paleo-geographic data, the plate-tectonic data, and the plate-interaction data, and along a vertical axis that represents a time scale or a thickness scale for the present-day geological data, the paleo-geographic data, the plate-tectonic data, and the plate-interaction data; and
outputting the graphical user interface for use in planning or performing a wellbore operation to extract hydrocarbon fluid.

2. The system of claim 1, wherein the operation of reconstructing the geological-historical parameters in the separate time intervals in the geological time frame includes:
generating a temporal geological model for the location of the geological point location of interest or of the well trajectory of interest by accessing a plate tectonic geo-database and a paleo-geographic geo-database, wherein the plate tectonic geo-database includes rotation pole information, polygon identifications and plate boundary lines;
executing rotational analysis on the temporal geological model for reconstructing the geological-historical parameters in the separate time intervals in the geological time frame; and
outputting the reconstructed geological-historical parameters on the graphical user interface and in a useable tabular format.

3. The system of claim 2, wherein the operation of outputting the graphical user interface includes generating the graphical user interface comprising:
a vertical axis that includes a plurality of vertical sections;
a horizontal axis;
an option for selecting the time scale or the thickness scale; and
wherein:
the plurality of vertical sections includes the present-day geological data, the paleo-geographic data, the plate-tectonic data, and the plate-interaction data;
the vertical axis represents an independent variable that includes time values for the time scale, or thickness values for the thickness scale, for the present-day geological data, the paleo-geographic data, the plate-tectonic data, and the plate-interaction data;
the independent variable is on the vertical axis for each of the present-day geological data, the paleo-geographic data, the plate-tectonic data, and the plate-interaction data;
the horizontal axis represents a plurality of dependent variables, the plurality of dependent variables including:
thickness, age, and lithology which is a rock type for the present-day geological data;
degrees of paleo-latitude or paleo-longitude, paleo-elevation or paleo-bathymetry, and paleo-temperature for the paleo-geographic data;
velocity and distance for the plate-tectonic data; and
relative movement and setting type for the plate-interaction data; and
each dependent variable of the plurality of dependent variables is respectively on one vertical section of the plurality of vertical sections for the present-day geological data, the paleo-geographic data, the plate-tectonic data, or the plate-interaction data.

4. The system of claim 1, wherein the paleo-geographic data includes temperature, the plate-tectonic data includes point velocity, and the plate-interaction data includes an amount of relative movement.

5. The system of claim 4, wherein the temperature is atmospheric paleo-temperature, the paleo-geographic data further including paleo-elevation, wherein the plate-tectonic data further includes a distance to plate boundaries, and wherein the plate-interaction data further includes a geodynamic setting qualifier.

6. The system of claim 1, wherein the operation of outputting the graphical user interface for use in planning or performing a wellbore operation to extract hydrocarbon fluid includes outputting the present-day geological data, the paleo-geographic data, the plate-tectonic data, and the plate-interaction data for use in a geological modeling application.

7. The system of claim 1, wherein the operation of reconstructing the geological-historical parameters in the separate time intervals in the geological time frame includes correlating with the geological-historical parameters in the separate time intervals based on stratigraphic time-attributes.

8. A method comprising:
receiving a location of a geological point location of interest or of a well trajectory of interest for subterranean exploration and a geological time frame for the geological point location of interest or for the well trajectory of interest;
determining present-day data about the geological point location of interest based on the location of the geological point location of interest or about the well trajectory of interest based on the location of the well trajectory of interest;
generating a pseudo-well in separate time intervals in the geological time frame using the received location of the geological point location of interest or of the well trajectory of interest and plate-tectonic models;
reconstructing, using paleo-geographic datasets and the generated pseudo-well, geological-historical parameters in the separate time intervals in the geological time frame, the geological-historical parameters including paleo-geographic data, plate-tectonic data, and plate-interaction data for a geological history about the geological point location of interest or about the well trajectory of interest;
generating a graphical user interface that includes the present-day data longitudinally arranged with respect to the paleo-geographic data, the plate-tectonic data, and the plate-interaction data, and along a vertical axis that represents a time scale or a thickness scale for the present-day data, the paleo-geographic data, the plate-tectonic data, and the plate-interaction data; and
outputting the graphical user interface for use in planning or performing a wellbore operation to extract hydrocarbon fluid.

9. The method of claim 8, wherein the operation of reconstructing the geological-historical parameters in the separate time intervals in the geological time frame includes:
generating a temporal geological model for the location of the geological point location of interest or for the location of the well trajectory of interest by accessing a plate tectonic geo-database, wherein the plate tectonic geo-database includes rotation pole information, polygon identifications;
executing rotational analysis on the temporal geological model for reconstructing the geological-historical parameters in the separate time intervals in the geological time frame; and
outputting the reconstructed geological-historical parameters on the graphical user interface and in a useable tabular format.

10. The method of claim 9, wherein the operation of outputting the graphical user interface includes generating the graphical user interface comprising:
a vertical axis that includes a plurality of vertical sections;
a horizontal axis;
an option for selecting the time scale or the thickness scale; and
wherein:
the plurality of vertical sections includes the present-day data, the paleo-geographic data, the plate-tectonic data, and the plate-interaction data;
the vertical axis represents an independent variable that includes time values for the time scale, or thickness values for the thickness scale, for the present-day data, the paleo-geographic data, the plate-tectonic data, and the plate-interaction data;
the independent variable is on the vertical axis for each of the present-day data, the paleo-geographic data, the plate-tectonic data, and the plate-interaction data;
the horizontal axis represents a plurality of dependent variables, the plurality of dependent variables including:
thickness, age and lithology which is a rock type for the present-day data;

degrees of paleo-latitude or paleo-longitude, paleo-elevation or paleo-bathymetry, and paleo-temperature for the paleo-geographic data;
velocity and distance for the plate-tectonic data; and
relative movement and setting type for the plate-interaction data; and
each dependent variable of the plurality of dependent variables is respectively on one vertical section of the plurality of vertical sections for the present-day data, the paleo-geographic data, the plate-tectonic data, or the plate-interaction data.

11. The method of claim 8, wherein the paleo-geographic data includes paleo-temperature, the plate-tectonic data includes point velocity or the like, and the plate-interaction data includes an amount of relative movement or the like.

12. The method of claim 11, wherein the paleo-temperature is atmospheric or oceanic paleo-temperature, the paleo-geographic data further including paleo-elevation, wherein the plate-tectonic data further includes a distance to plate boundaries, and wherein the plate-interaction data further includes a geodynamic setting qualifier.

13. The method of claim 8, wherein the operation of outputting the graphical user interface for use in planning or performing a wellbore operation to extract hydrocarbon fluid includes outputting the present-day data, the paleo-geographic data, the plate-tectonic data, and the plate-interaction data for use in a geological modeling application.

14. The method of claim 8, wherein the operation of reconstructing the geological-historical parameters in the separate time intervals in the geological time frame includes correlating the present-day data and the geological-historical parameters in the separate time intervals based on stratigraphic time-attributes.

15. A non-transitory computer-readable medium comprising instructions that are executable by a processing device for causing the processing device to perform operations comprising:
receiving a location of a geological point location of interest or of a well trajectory of interest for subterranean exploration and a geological time frame for the geological point location of interest or for the well trajectory of interest;
determining present-day data about the geological point location of interest based on the location of the geological point location of interest or about the well trajectory of interest based on the location of the well trajectory of interest;
generating a pseudo-well in separate time intervals in the geological time frame using the received location of the geological point location of interest or of the well trajectory of interest and plate-tectonic models;
reconstructing, using paleo-geographic datasets and the generated pseudo-well, geological-historical parameters in the separate time intervals in the geological time frame, the geological-historical parameters including paleo-geographic data, plate-tectonic data, and plate-interaction data for a geological history about the geological point location of interest or about the well trajectory of interest;
generating a graphical user interface that includes the present-day data longitudinally arranged with respect to the paleo-geographic data, the plate-tectonic data, and the plate-interaction data, and along a vertical axis that represents a time scale or a thickness scale for the present-day data, the paleo-geographic data, the plate-tectonic data, and the plate-interaction data; and
outputting the graphical user interface for use in planning or performing a wellbore operation to extract hydrocarbon fluid.

16. The non-transitory computer-readable medium of claim 15, wherein the operation of reconstructing the geological-historical parameters in the separate time intervals in the geological time frame includes:
generating a temporal geological model for the location of the geological point location of interest or of the well trajectory of interest by accessing a plate tectonic geo-database, wherein the plate tectonic geo-database includes rotation pole information, polygon identifications, and plate boundary lines;
executing rotational analysis on the temporal geological model for reconstructing the geological-historical parameters in the separate time intervals in the geological time frame; and
outputting the reconstructed geological-historical parameters on the graphical user interface and in a useable tabular format.

17. The non-transitory computer-readable medium of claim 16, wherein the operation of outputting the graphical user interface includes generating the graphical user interface comprising:
a vertical axis that includes a plurality of vertical sections;
a horizontal axis;
an option for selecting the time scale or the thickness scale; and
wherein:
the plurality of vertical sections includes the present-day data, the paleo-geographic data, the plate-tectonic data, and the plate-interaction data;
the vertical axis represents an independent variable that includes time values for the time scale, or thickness values for the thickness scale, for the present-day data, the paleo-geographic data, the plate-tectonic data, and the plate-interaction data;
the independent variable is on the vertical axis for each of the present-day data, the paleo-geographic data, the plate-tectonic data, and the plate-interaction data;
the horizontal axis represents a plurality of dependent variables, the plurality of dependent variables including:
thickness, age, and lithology which is a rock type for the present-day data;
degrees of paleo-latitude or paleo-longitude, paleo-elevation or paleo-bathymetry, and paleo-temperature for the paleo-geographic data;
velocity and distance for the plate-tectonic data; and
relative movement and setting type for the plate-interaction data; and
each dependent variable of the plurality of dependent variables is respectively on one vertical section of the plurality of vertical sections for the present-day data, the paleo-geographic data, the plate-tectonic data, or the plate-interaction data.

18. The non-transitory computer-readable medium of claim 15, wherein the paleo-geographic data includes paleo-temperature, the plate-tectonic data includes point velocity, and the plate-interaction data includes an amount of relative movement.

19. The non-transitory computer-readable medium of claim 18, wherein the paleo-temperature is atmospheric or oceanic paleo-temperature, the paleo-geographic data further including paleo-elevation, wherein the plate-tectonic data further includes a distance to plate boundaries, and wherein the plate-interaction data further includes a geodynamic setting qualifier.

20. The non-transitory computer-readable medium of claim 15, wherein the operation of outputting the graphical user interface for use in planning or performing a wellbore operation to extract hydrocarbon fluid includes outputting the present-day data, the paleo-geographic data, the plate-tectonic data, and the plate-interaction data for use in a geological modeling application.

* * * * *